United States Patent
Murofushi et al.

(10) Patent No.: US 8,349,934 B2
(45) Date of Patent: Jan. 8, 2013

(54) HARDENING COMPOSITION AND HARDENED PRODUCT THEREOF

(75) Inventors: Katsumi Murofushi, Minato-ku (JP); Nobuaki Ishii, Minato-ku (JP); Shigeru Yamaki, Minato-ku (JP); Hideo Miyata, Minato-ku (JP); Yotaro Hattori, Minato-ku (JP)

(73) Assignee: Showa Denko K.K., Tokyo (JP)

( * ) Notice: Subject to any disclaimer, the term of this patent is extended or adjusted under 35 U.S.C. 154(b) by 12 days.

(21) Appl. No.: 13/139,847

(22) PCT Filed: Dec. 10, 2009

(86) PCT No.: PCT/JP2009/070684
§ 371 (c)(1), (2), (4) Date: Jun. 15, 2011

(87) PCT Pub. No.: WO2010/071073
PCT Pub. Date: Jun. 24, 2010

(65) Prior Publication Data
US 2011/0263779 A1  Oct. 27, 2011

(30) Foreign Application Priority Data

Dec. 16, 2008  (JP) ................. 2008-319433
Jun. 10, 2009  (JP) ................. 2009-139043

(51) Int. Cl.
C08K 3/04 (2006.01)
C08F 236/00 (2006.01)

(52) U.S. Cl. ........ 524/424; 428/403; 428/405; 526/308; 526/309; 526/323.1; 526/323.2; 524/496; 524/523

(58) Field of Classification Search ........................ None
See application file for complete search history.

(56) References Cited

U.S. PATENT DOCUMENTS

| | | | |
|---|---|---|---|
| 5,502,087 A * | 3/1996 | Tateosian et al. | 523/115 |
| 5,695,851 A | 12/1997 | Watanabe et al. | |
| 7,959,279 B2 * | 6/2011 | Nakamura | 347/100 |
| 2006/0160917 A1 * | 7/2006 | Oyanagi et al. | 522/7 |
| 2006/0251901 A1 * | 11/2006 | Armstrong et al. | 428/413 |
| 2011/0077334 A1 * | 3/2011 | Ol et al. | 524/264 |

FOREIGN PATENT DOCUMENTS

| | | |
|---|---|---|
| CN | 1552772 A | 12/2004 |
| JP | 04-009802 A | 1/1992 |
| JP | 7-258582 A | 10/1995 |
| JP | 10-090512 A | 4/1998 |
| JP | 2000-226488 A * | 8/2000 |
| JP | 2005-3772 A | 1/2005 |
| JP | 2008-138068 A | 6/2008 |
| JP | 2008-241767 A | 10/2008 |
| WO | 2008/015999 A1 | 2/2008 |

OTHER PUBLICATIONS

Machine-generated translation of JP 2000-226488.*
Extended European Search Report for corresponding Application No. 09833376.8-2109/2380916 PCT/JP2009070684 dated Oct. 22, 2012.

* cited by examiner

Primary Examiner — Marc Zimmer
(74) Attorney, Agent, or Firm — Sughrue Mion, PLLC

(57) ABSTRACT

The present invention is directed to a hardening composition comprising silica fine particles (a), a (meth)acrylate (b) having two or more ethylenically unsaturated groups and being free from cyclic structure, a (meth)acrylate (c) having an ethylenically unsaturated group and having an alicyclic structure, a polymerization initiator (d) and black inorganic fine particles (e), wherein the silica fine particles (a) are surface-treated with a silane compound (f) represented by the following general formula (1) and a silane compound (g) represented by the following general formula (2):

[Chem. 1]

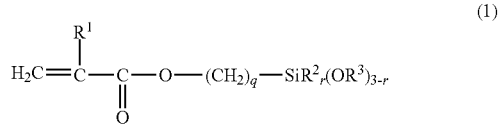

(1)

(in the formula (1), $R^1$ represents a hydrogen atom or a methyl group, $R^2$ represents an alkyl group having 1 to 3 carbon atoms or a phenyl group, $R^3$ represents a hydrogen atom or a hydrocarbon group having 1 to 10 carbon atoms; q represents an integer of 1 to 6; and r represents an integer of 0 to 2,

[Chem. 2]

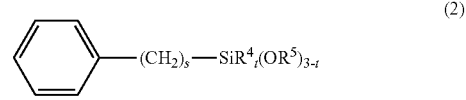

(2)

(in the formula (2), $R^4$ is an alkyl group having 1 to 3 carbon atoms or a phenyl group which may have a substituent; $R^5$ is a hydrogen atom or a hydrocarbon group having 1 to 10 carbon atoms; s is an integer of 0 to 6; and t is an integer of 0 to 2.

15 Claims, No Drawings

HARDENING COMPOSITION AND HARDENED PRODUCT THEREOF

CROSS REFERENCE TO RELATED APPLICATIONS

This application is a National Stage of International Application No. PCT/JP2009/070684 filed Dec. 10, 2009, the disclosure of which is incorporated herein by reference in its entirety.

TECHNICAL FIELD

The present invention relates to a hardening composition with low viscosity and superior handling characteristics and a hardened product which is obtained by hardening the hardening composition and has superior light-shielding effect, heat resistance and molding processability, and optionally has superior electrical conductivity. The hardened product is useful as a light-shielding component for various optical equipments such as a camera, a video camera, a copying machine and a developing machine.

BACKGROUND ART

In recent years, a product functioning as a camera or a video camera has been rapidly made small enough to be put in a pocket and carried or to be optionally mounted on other electronic devices such as a mobile phone. Because of the compact size of these optical equipments, the need has been increasing year by year to lighten and reduce the size of components constituting those equipments.

In general, a light-shielding material used for a camera or the like has been primarily a metal. But, in view of lightening and reducing the size of the component and achieving cost reduction, the switching to a plastic material such as a resin film was desired. As a resin film used for the light-shielding component, for example, JP-2008-138068A (Patent Document 1) discloses that a resin obtained by dispersing carbon blacks in a polyester film will provide a film with high light-shielding effect. JP-H04-009802 (Patent Document 2) discloses a process for coating both faces of a synthetic resin film with a thermosetting resin composition containing carbon blacks to provide a light-shielding film.

However, recent tendency to adopt a production process using reflow soldering to increase the productivity demands that the resin used for a lens unit of a camera withstand the reflow soldering process. The light-shielding film as exemplified above, because having a low glass transition temperature (Tg) as a component and having no reflow soldering resistance, cannot be produced in the production process including the reflow soldering process. For this reason, the productivity has not been improved.

In addition, the light-shielding material is required to have good molding processability. Furthermore, when used for a component for precision equipment, the material is required to have electrical conductivity, as needed, to reduce troubles due to static electricity.

CITATION LIST

Patent Documents

Patent Document 1: JP-2008-138068A
Patent Document 2: JP-H04-009802A

SUMMARY OF THE INVENTION

Problem to be Solved by the Invention

It is an object of the present invention to provide a hardening composition which can give a light-shielding component and the like for various optical equipments such as a camera, a video camera, a copying machine and a developing machine and which can solve the problem associated with conventional technology.

That is, it is an object of the present invention to provide a hardening composition with superior handling characteristics which can give a hardened product with superior light-shielding effect, heat resistance and molding processability, and optionally with superior electrical conductivity.

Means for Solving the Problem

The present inventors made earnest study to achieve the above object and found out a hardening composition has low viscosity and superior handling characteristics when comprising silica fine particles surface-treated with specific silane compounds, a (meth)acrylate having two or more ethylenically unsaturated groups and being free from cyclic structure, a (meth)acrylate having an ethylenically unsaturated group and having an alicyclic structure, a polymerization initiator and black inorganic fine particles. They also found out that the hardening of the above hardening composition can provide a hardened product which has superior light-shielding effect, heat resistance and molding processability, and optionally with superior electrical conductivity and which can be suitably used for a light-shielding component for various optical equipments such as a camera, a video camera, a copying machine and a developing machine.

Specifically, the present invention is summarized as follows:

[1] A hardening composition comprising:
silica fine particles (a),
a (meth)acrylate (b) having two or more ethylenically unsaturated groups and being free from cyclic structure,
a (meth)acrylate (c) having an ethylenically unsaturated group and having an alicyclic structure,
a polymerization initiator (d) and
black inorganic fine particles (e), wherein the silica fine particles (a) are surface-treated with a silane compound (f) represented by the following general formula (1) and a silane compound (g) represented by the following general formula (2).

[Chem. 1]

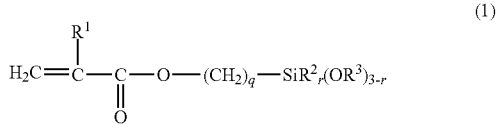
(1)

In the formula (1), $R^1$ represents a hydrogen atom or a methyl group, $R^2$ represents an alkyl group having 1 to 3 carbon atoms or a phenyl group, $R^3$ represents a hydrogen atom or a hydrocarbon group having 1 to 10 carbon atoms; q represents an integer of 1 to 6; and r represents an integer of 0 to 2.

[Chem. 2]

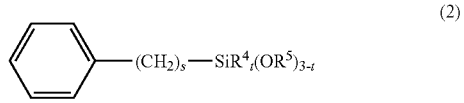

(2)

In the formula (2), $R^4$ is an alkyl group having 1 to 3 carbon atoms or a phenyl group which may have a substituent; $R^5$ is a hydrogen atom or a hydrocarbon group having 1 to 10 carbon atoms; s is an integer of 0 to 6; and t is an integer of 0 to 2.

[2] The hardening composition as described in [1], wherein the (meth)acrylate (b) is a (meth)acrylate having three ethylenically unsaturated groups and being free from cyclic structure.

[3] The hardening composition as described in [1] or [2], wherein the silica fine particles (a) are obtained by surface-treating silica fine particles which have not been surface-treated with 5 to 25 parts by mass of the silane compound (f) based on 100 parts by mass of the silica fine particles and with 5 to 25 parts by mass of the silane compound (g) based on 100 parts by mass of the silica fine particles.

[4] The hardening composition as described in any one of [1] to [3], wherein the glass transition temperature of a homopolymer of the (meth)acrylate (b) and the glass transition temperature of a homopolymer of the (meth)acrylate (c) are 150° C. or higher.

[5] The hardening composition as described in any one of [1] to [4], wherein the black inorganic fine particles (e) are at least one selected from the group consisting of carbon blacks, titanium black and carbon nanotubes.

[6] The hardening composition as described in any one of [1] to [4], wherein the black inorganic fine particles (e) are carbon blacks and/or titanium black.

[7] The hardening composition as described in [6], wherein the carbon blacks and/or titanium black have a number average particle diameter of 5 to 200 nm.

[8] The hardening composition as described in any one of [1] to [4], wherein the black inorganic fine particles (e) are carbon blacks surface-treated with a silicone resin.

[9] The hardening composition as described in [8], wherein the carbon blacks surface-treated with a silicone resin have a number average particle diameter of 5 to 200 nm.

[10] The hardening composition as described in any one of [1] to [4], wherein the black inorganic fine particles (e) are carbon nanotubes.

[11] The hardening composition as described in [10], wherein the carbon nanotubes have an average diameter of 0.5 to 200 nm and an average length of 100 nm to 50 μm.

[12] The hardening composition as described in anyone of [1] to [11], which has a viscosity of 30 to 2000 mPa·s.

[13] A hardened product formed by hardening the hardening composition as described in any one of [1] to [12].

[14] A light-shielding film comprising the hardened product as described in [13].

Effect of the Invention

According to the present invention, there is provided a hardening composition with superior handling characteristics which can give a hardened product with superior light-shielding effect, heat resistance and molding processability, and optionally with superior electrical conductivity. There is also provided a hardened product of the hardening composition.

EMBODIMENT FOR CARRYING OUT THE INVENTION

Hereinafter, the present invention will be described in detail.
[Hardening Composition]
The hardening composition of the present invention comprises silica fine particles (a), a (meth)acrylate (b) having two or more ethylenically unsaturated groups and being free from cyclic structure, a (meth)acrylate (c) having an ethylenically unsaturated group and having an alicyclic structure, a polymerization initiator (d) and black inorganic fine particles (e), wherein the silica fine particles (a) are surface-treated with specific silane compounds. Hereinafter, each of these structural components will be described. The (meth)acrylate used herein means a methacrylate and/or an acrylate.
<Silica Fine Particles (a)>
The silica fine particles (a) used in the present invention are suitably particles with an average particle diameter of 1 to 100 nm. When the average particle diameter is less than 1 nm, the resultant hardening composition tends to have increased viscosity and have a limited content and interior dispersibility of the silica fine particles (a) therein, which tends to lead to insufficient heat resistance of a hardened product obtained by hardening the hardening composition (hereinafter also referred to as a hardened product). When the average particle diameter is more than 100 nm, the resultant product may have inferior appearance and mechanical properties.

The average particle diameter of the silica fine particle (a) is more preferably 1 to 50 nm, still more preferably 5 to 50 nm, most preferably 5 to 40 nm in view of controlling the viscosity of the hardening composition so as to fall within a preferable value. The average particle diameter of the silica fine particles (a) can be obtained as follows. The silica fine particles are observed with a high-resolution transmission electron microscope (manufactured by Hitachi, Ltd.; H9000), and an image of 100 silica particles is arbitrarily selected in an observed image of the fine particles and are averaged by a publicly known image data statistical processing method, thereby to give a number average particle diameter defined as the average particle diameter.

In the present invention, in order for the hardened product to have increased amount of the silica fine particles (a), a mixture of silica fine particles with different average particle diameters may be used. In addition, as the silica fine particles (a), a porous silica sol or a complex metal oxide of silicon with aluminum, magnesium, zinc or the like may be used.

The content of the silica fine particles (a) in the hardening composition is preferably 20 to 80% by mass, and in view of the balance between the heat resistance and environmental resistance of the hardened product and the viscosity of the hardening composition, the content is more preferably 40 to 60% by mass. When the content is 20 to 80% by mass, superior fluidity of the hardening composition and dispersibility of the silica fine particles (a) in the hardening composition are achieved, and therefore the hardening composition can readily provide a hardened product having sufficient strength, heat resistance and environmental resistance.

The silica fine particles (a) of the present invention have been surface-treated with a silane compound (f) and a silane compound (g). That is, the silica fine particles (a) are obtained by surface-treating silica fine particles which have not been surface-treated with the silane compound (f) and the silane compound (g). Hereinafter, each silane compound will be described. A method for surface-treating the silica fine particles (a) will be described later.

<Silane Compound (f)>

The silane compound (f) is represented by the following general formula (1).

[Chem. 3]

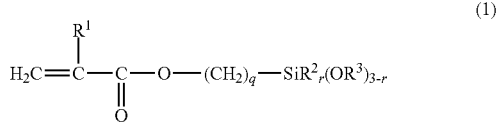

In the formula (1), $R^1$ represents a hydrogen atom or a methyl group, $R^2$ represents an alkyl group having 1 to 3 carbon atoms or a phenyl group, $R^3$ represents a hydrogen atom or a hydrocarbon group having 1 to 10 carbon atoms; q represents an integer of 1 to 6; and r represents an integer of 0 to 2.

In order for the hardening composition to have decreased viscosity and have storage stability, $R^3$ is preferably a methyl group, q is preferably 3, and r is preferably 0. When $R^2$ is present, $R^2$ is preferably a methyl group.

The silane compound (f) is used in order to decrease the viscosity of the hardening composition, to improve the dispersion stability of the silica fine particles (a) in the hardening composition through the reaction with a (meth)acrylate (b), described later, to decrease the hardening shrinkage when hardening the hardening composition and to provide the hardened product with molding processability. That is, when the silica fine particles are not surface-treated with the silica compound (f), the resultant hardening composition undesirably has increased viscosity, and significant hardening shrinkage when hardened, and the resultant hardened product is undesirably brittle and has cracks.

Examples of the silane compound (f) include:
γ-acryloxypropyldimethylmethoxysilane,
γ-acryloxypropylmethyldimethoxysilane,
γ-acryloxypropyldiethylmethoxysilane,
γ-acryloxypropylethyldimethoxysilane,
γ-acryloxypropyltrimethoxysilane,
γ-acryloxypropyldimethylethoxysilane,
γ-acryloxypropylmethyldiethoxysilane,
γ-acryloxypropyldiethylethoxysilane,
γ-acryloxypropylethyldiethoxysilane,
γ-acryloxypropyltriethoxysilane,
γ-methacryloxypropyldimethylmethoxysilane,
γ-methacryloxypropylmethyldimethoxysilane,
γ-methacryloxypropyldiethylmethoxysilane,
γ-methacryloxypropylethyldimethoxysilane,
γ-methacryloxypropyltrimethoxysilane,
γ-methacryloxypropyldimethylethoxysilane,
γ-methacryloxypropylmethyldiethoxysilane,
γ-methacryloxypropyldiethylethoxysilane,
γ-methacryloxypropylethyldiethoxysilane, and
γ-methacryloxypropyltriethoxysilane.

Of these, in view of preventing the silica fine particles (a) from aggregating in the hardening composition, decreasing the viscosity and improving the storage stability of the hardening composition, preferable are:
γ-acryloxypropyldimethylmethoxysilane,
γ-acryloxypropylmethyldimethoxysilane,
γ-methacryloxypropyldimethylmethoxysilane,
γ-methacryloxypropylmethyldimethoxysilane,
γ-acryloxypropyltrimethoxysilane, and
γ-methacryloxypropyltrimethoxysilane; and more preferable is γ-acryloxypropyltrimethoxysilane.

These can be used in combination of two or more kinds.

These silane compounds (f) can be produced by publicly known methods, or are commercially available.

In the surface-treatment of the silica fine particles, the silane compound (f) is usually used in an amount of 5 to 25 parts by mass, preferably 10 to 20 parts by mass, more preferably 12 to 18 parts by mass, based on 100 parts by mass of the silica fine particles which have not been surface-treated. When the silane compound (f) is used in an amount of less than 5 parts by mass, the hardening composition has increased viscosity and may be gelled because of the silica fine particles (a) having deteriorated dispersibility in the hardening composition. When the amount is more than 20 parts by mass, the silica fine particles (a) may aggregate. If the surface-treatment of the silica fine particles involves the use of an organic solvent dispersion liquid of the silica fine particles, the aforementioned mass of the silica fine particles refers only to the mass of the silica particles per se dispersed in the organic solvent.

When the hardening composition contains a large amount of acrylates (an acrylate (b) and an acrylate (c) mentioned later), the silane compound (f) is preferably a silane compound having an acrylic group, i.e., represented by the general formula (1) wherein $R^1$ is a hydrogen atom. When the hardening composition contains a large amount of methacrylates (a methacrylate (b) and methacrylate (c) mentioned later), the silane compound (f) is preferably a silane compound having a methacrylic group, i.e., represented by the general formula (1) wherein $R^1$ is a methyl group. In such cases, hardening reaction easily takes place when the hardening composition of the present invention is hardened.

<Silane Compound (g)>

The silane compound (g) used in the present invention is represented by the following general formula (2).

[Chem. 4]

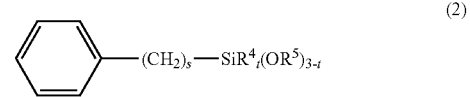

In the formula (2), $R^4$ is an alkyl group having 1 to 3 carbon atoms or a phenyl group which may have a substituent; $R^5$ is a hydrogen atom or a hydrocarbon group having 1 to 10 carbon atoms; s is an integer of 0 to 6; and t is an integer of 0 to 2. A substituent may be bonded to the phenyl group as long as not impairing the effect of the present invention. Examples of the substituent bonded to the phenyl group to form a group include a methyl group, an ethyl group, a methoxy group, a hydroxyl group, a carboxylic group, a fluoro group, a phenyl group and a naphthyl group.

In view of decreasing the viscosity of the hardening composition and providing the storage stability of the hardening composition, $R^5$ is preferably a methyl group, s is preferably 0 or 1, and t is preferably 0. If $R^4$ is present, $R^4$ is preferably a methyl group.

When the silica fine particles are reacted with the silane compound (g), the silica fine particles are given hydrophobicity on the surface and have improved dispersibility in the organic solvent, and at the same time, have superior compatibility with the later-mentioned (meth)acrylate (c). As a result thereof, the hardening composition can have decreased viscosity, improved storage stability and lowered water absorptivity.

Examples of the silane compound (g) include:
phenyldimethylmethoxysilane,
phenylmethyldimethoxysilane,
phenyldiethylmethoxysilane,
phenylethyldimethoxysilane,
phenyltrimethoxysilane,
phenyldimethylethoxysilane,
phenylmethyldiethoxysilane,
phenyldiethylethoxysilane,
phenylethyldiethoxysilane,
phenyltriethoxysilane,
benzyldimethylmethoxysilane,
benzylmethyldimethoxysilane,
benzyldiethylmethoxysilane,
benzylethyldimethoxysilane,
benzyltrimethoxysilane,
benzyldimethylethoxysilane,
benzylmethyldiethoxysilane,
benzyldiethylethoxysilane,
benzylethyldiethoxysilane, and
benzyltriethoxysilane.

Of these, in order for the hardening composition to have decreased viscosity, improved storage stability and improved environmental resistance including lowered water absorptivity, preferable are:
phenyldimethylmethoxysilane,
phenylmethyldimethoxysilane,
phenyldiethylmethoxysilane,
phenylethyldimethoxysilane, and
phenyltrimethoxysilane, and more preferable is
phenyltrimethoxysilane. These silane compounds can be used in combination of two or more kinds.

These silane compounds (g) can be produced by publicly known methods, or are commercially available.

In the surface-treatment of the silica fine particles, the silane compound (g) is usually used in an amount of 5 to 25 parts by mass, preferably 10 to 20 parts by mass, more preferably 12 to 18 parts by mass, based on 100 parts by mass of the silica fine particles which have not been surface-treated. When the silane compound (g) is used in an amount of less than 5 parts by mass, the hardening composition has increased viscosity and may be gelled or lead to a hardened product having inferior heat resistance. When the amount is more than 20 parts by mass, the silica fine particles (a) may aggregate. If the surface-treatment of the silica fine particles involves the use of an organic solvent dispersion liquid of the silica fine particles, the aforementioned mass of the silica fine particles refers only to the mass of the silica particles per se dispersed in the organic solvent.

When the total amount of the silane compound (f) and the silane compound (g) is more than 50 parts by mass based on 100 parts by mass of the silica fine particles, because of the excessive amount of the treating agent, the surface-treatment of the silica fine particles is accompanied by a reaction between silica particles, which may result in the aggregation or gelation.

<(Meth)acrylate (b)>

Examples of the (meth)acrylate (b) having two or more ethylenically unsaturated groups and being free from cyclic structure used in the present invention include multi-functional (meth)acrylate such as:
trimethylolpropanetri(meth)acrylate,
pentaerythritoltri(meth)acrylate,
pentaerythritoltetra(meth)acrylate,
dipentaerythritoltetra(meth)acrylate,
dipentaerythritolpenta(meth)acrylate,
dipentaerythritolhexa (meth)acrylate, and
trimethylolpropanetrioxyethyl(meth)acrylate.

In addition to the above, a multi-functional urethane(meth) acrylate free from cyclic structure can be mentioned. These may be used alone or in combination of two or more kinds. The "cyclic structure" used herein refers to a benzene ring, a hetero ring and a cycloalkyl ring.

When the hardening composition of the invention containing these is hardened, a hardening product with superior heat resistance is formed.

Of these, in view of the heat resistance of the hardened product, those having three ethylenically unsaturated groups are preferable, and those with the glass transition temperatures of the homopolymers being 150° C. or higher are preferable. In particular, most preferable is trimethylolpropanetri (meth)acrylate, which has a glass transition temperature of the homopolymer being 200° C. or higher and has relatively less hardening shrinkage among multi-functional (meth) acrylates.

The glass transition temperature of the homopolymer is measured by the following method. In 100 parts by mass of the (meth)acrylate (b), 1 part by mass of diphenyl-(2,4,6-trimethylbenzoyl)phosphineoxide (product name: Speedcure TPO-L, manufactured by Nihon Siber Hegner K.K.) as a photopolymerization initiator is dissolved. Then, a glass substrate (50 mm×50 mm) is coated with the solution so that a hardened film will have a thickness of 100 μm. The coating film is irradiated with an irradiating device equipped with an ultra-high pressure mercury lamp at 3 J/cm$^2$ to harden the coating film. The hardened film is cut into a strip of 5 mm×30 mm, and the strip is used as a specimen. With the specimen, measurement is carried out using DMS6100 (manufactured by SEIKO Electronics Industries Ltd.), at a tensile mode, at temperatures ranging from 20° C. to 300° C., by elevating temperature at a rate of 2° C./min, at a frequency of 1 Hz, to give a peak temperature of a tan δ, which is defined as a glass transition temperature.

The (meth)acrylate (b) used in the present invention is blended preferably in an amount of 20 to 500 parts by mass based on 100 parts by mass of the silica fine particles which have not been surface-treated. In view of the viscosity of the hardening composition, the dispersion stability of the silica fine particles (a) in the hardening composition, and the heat resistance of the hardened product, the blended amount is more preferably 30 to 300 parts by mass, still more preferably 50 to 200 parts by mass. When the blended amount is less than 20 parts by mass, the hardening composition has increased viscosity and may be gelled. When the blended amount is more than 500 parts by mass, the hardening composition has significant shrinkage when hardened, which may result in a hardened product having warpage or cracks.

<(Meth)acrylate (c)>

The (meth)acrylate (c) having an ethylenically unsaturated group and having an alicyclic structure is used in order to provide a hardened product with heat resistance and environmental resistance and to decrease the shrinkage in hardening. In particular, a (meth)acrylate having an ethylenically unsaturated group and having an alicyclic structure is preferably used. Examples of such (meth)acrylates include cycloalkyl (meth)acrylates such as:
cyclohexyl(meth)acrylate,
4-butylcyclohexyl(meth)acrylate,
dicyclopentanyl(meth)acrylate,
dicyclopentenyl(meth)acrylate,
dicyclopentadienyl(meth)acrylate,
bornyl(meth)acrylate,
isobornyl(meth)acrylate,
tricyclodecanyl(meth)acrylate, tricyclodecanedimethapoldiacrylate, and
adamantyl(meth)acrylate;
benzyl(meth)acrylate; and
tetrahydrofurfuryl(meth)acrylate.

In addition to the above, an urethane(meth)acrylate having an alicyclic structure can be mentioned. These may be used alone or in combination of two or more kinds.

Of these, in view of the heat resistance of the hardened product, preferable are (meth)acrylates with the glass transition temperatures of the homopolymers being 150° C. or higher. The method for measuring the glass transition temperature of the homopolymer is as described above.

Of the (meth)acrylates exemplified above, in view of the heat resistance and environmental resistance of the hardened product, preferable are dicyclopentanyl(meth)acrylate and adamantyl(meth)acrylate, and most preferable is adamantyl (meth)acrylate, which has a high glass transition temperature of a homopolymer.

The alicyclic structure refers to a structure where carbon atoms are annularly bonded, except for an aromatic ring structure.

The (meth)acrylate (c) used in the present invention is blended preferably in an amount of 5 to 400 parts by mass based on 100 parts by mass of the silica fine particles which have not been surface-treated. In view of the viscosity of the hardening composition, the dispersion stability of the silica fine particles (a) in the hardening composition, and the heat resistance of the hardened product, the blended amount is more preferably 10 to 200 parts by mass, still more preferably 20 to 100 parts by mass. When the blended amount is less than 5 parts by mass, the hardening composition has increased viscosity and may be gelled. When the blended amount is more than 400 parts by mass, the hardened product may have cracks or have inferior heat resistance and environmental resistance.

<Polymerization Initiator (d)>

Examples of the polymerization initiator (d) used in the present invention include radical-generating photopolymerization initiators and heat polymerization initiators. These may be used alone or in combination of two or more kinds.

Examples of the photopolymerization initiators include;
benzophenone,
benzoinmethylether,
benzoinpropylether,
diethoxyacetophenone,
1-hydroxy-phenylphenylketone,
2,6-dimethylbenzoyldiphenylphosphineoxide,
2,4,6-trimethylbenzoyldiphenylphosphineoxide, and
diphenyl-(2,4,6-trimethylbenzoyl)phosphineoxide.

These photopolymerization initiators may be used in combination of two or more kinds.

The content of the photopolymerization initiator in the hardening composition may be such amount as to appropriately harden the hardening composition. Based on the entire hardening composition, the content is preferably 0.01 to 10% by mass, more preferably 0.02 to 5% by mass, still more preferably 0.1 to 2% by mass. When the photopolymerization initiator is added in too large amount, the hardening composition may have inferior storage stability, may be colored, or when crosslinked to provide a hardened product, may be crosslinked so rapidly as to cause a problem such as fractures in hardening. In addition, there may be possible contamination of apparatus because of increased emission gas component in high-temperature treatment. On the other hand, when the photopolymerization initiator is added in too small amount, the hardening of the hardening composition may be insufficient.

Examples of the heat polymerization initiators include:
benzoylperoxide,
diisopropylperoxycarbonate,
t-butylperoxy(2-ethylhexanoate),
1,1-di(t-hexylperoxy)cyclohexane,
1,1-di(t-butylperoxy)cyclohexane,
2,2-di(4,4-di-(t-butylperoxy)cyclohexyl)propane,
t-hexylperoxypropylmonocarbonate,
t-butylperoxymaleicacid,
t-butylperoxy-3,5,5-trimethylhexanoate,
t-butylperoxylaurate,
t-butylperoxopropylmonocarbonate,
t-butylperoxy-2-ethylhexylmonocarbonate,
t-hexylperoxybenzoate,
2,5-dimethyl-2,5-di(benzoylperoxy)hexane,
t-butylperoxyacetate,
2,2-di(t-butylperoxy)butane,
t-butylperoxybenzoate,
n-butyl-4,4-di(t-butylperoxy)valerate,
di(2-t-butylperoxyisopropyl)benzene,
dicumylperoxide,
di-t-butylperoxide,
2,5-dimethyl-2,5-di(t-butylperoxy)hexane,
t-butylcumylperoxide,
di-t-hexylperoxide,
p-menthanehydroperoxide,
2,5-dimethyl-2,5-di(t-butylperoxy)hexane-3,
diisopropylbenzenehydroperoxide,
1,1,3,3-tetramethylbutylhydroperoxide,
cumenehydroperoxide,
t-butylhydroperoxide,
2,3-dimethyl-2,3-diphenylbutane,
2,2-azobis(4-methoxy-2,4-dimethylvaleronitrile,
2,2'-azobis(2,4-dimethylvaleronitrile),
dimethyl-2,2'-azobis(2-methylpropionate),
2,2'-azobis(2-methylbutyronitrile),
1,1'-azobis(cyclohexane-1-carbonitrile),
2,2'-azobis(N-(2-propenyl)-2-methylpropionamide,
1-((1-cyano-1-methylethyl)azo)formamide,
2,2'-azobis(N-butyl-2-methylpropionamide), and
2,2'-azobis(N-cyclohexyl-2-methylpropionamide).

The content of the heat polymerization initiator in the hardening composition is preferably 0.01 to 5% by mass, more preferably 0.1 to 2% by mass, based on the entire hardening composition. When the heat polymerization initiator is added in too large amount, the hardening composition may have inferior storage stability, may be colored, or when crosslinked to provide a hardened product, may be crosslinked so rapidly as to cause a problem such as fractures in hardening. In addition, there may be possible contamination of apparatus because of increased emission gas component in high-temperature treatment. On the other hand, when the heat polymerization initiator is added in too small amount, the hardening of the hardening composition may be insufficient.

When the photopolymerization initiator and the heat polymerization initiator are used in combination, the total contents of these polymerization initiators is preferably 0.01 to 10% by mass, more preferably 0.02 to 5% by mass, based on the entire hardening composition.

<Black Inorganic Fine Particles (e)>

Examples of the black inorganic fine particles (e) used in the present invention include:
acetylene black, lamp black, furnace black, ketjen black, thermal black and the like, which are collectively referred to as carbon blacks;

carbon particles such as graphite, carbon nanotubes, active carbon and perylene black;

titanium black;

composite oxide black pigments formed from metal oxides such as copper oxide, chromium oxide, iron oxide (including mars black, ferrite and magnetite), manganese oxide and cobalt oxide, titanium nitride, titanium oxynitride, molybdenum disulfide or alloys of metals contained therein;

azo black pigments such as aniline black;

organic black pigments such as cyanine black;

ivory black; peach black; and anthraquinone organic black pigments. Black pigments obtained by mixing organic pigments of three colors of red color, green color and blue color can be the black inorganic fine particles (e).

Of these, carbon blacks and titanium black are preferable, and in view of light-shielding effect and image characteristics, carbon blacks are particularly preferable. A mixture of carbon blacks and titanium black can be used. As the carbon blacks, those commercially available can be used, and the number average particle diameter thereof is preferably 5 to 200 nm, more preferably 10 to 100 nm in view of dispersibility and resolution. When the number average particle diameter is less than 5 nm, uniform dispersion is difficult. When the number average particle diameter is more than 200 nm, the resolution tends to be inferior.

In view of electrical conductivity, carbon nanotubes are preferable. As the carbon nanotubes, those commercially available can be used, and the average diameter thereof is preferably 0.5 to 300 nm, more preferably 1 to 200 nm. The average length thereof is preferably 100 nm to 50 µm, more preferably 200 nm to 20 µm.

The average particle diameter of the black inorganic fine particles (e) having a relatively small aspect ratio such as carbon blacks and titanium black can be obtained as follows. The black inorganic fine particles are observed with a high-resolution transmission electron microscope (manufactured by Hitachi, Ltd.; H9000) and 100 black inorganic fine particles are arbitrarily selected in an observed image of the fine particles and are averaged by a publicly known image data statistical processing method, to give a number average particle diameter defined as the average particle diameter.

When the black inorganic fine particles (e) are carbon nanotubes, the average diameter and the average length thereof are measured as follows. Carbon nanotubes are dispersed and fixed on a sample table of a SEM (Scanning Electron Microscope) with a double-faced adhesive tape or the like, and observed with a FESEM (Field Emission Scanning Electron Microscope). Then, tens to hundreds pieces of the carbon nanotubes are arbitrarily selected in an observed image and are averaged by a publicly known statistical processing method, to give the average diameter. On the other hand, the length of the carbon nanotubes is obtained as follows. A slight amount of carbon nanotubes is dispersed in a solvent such as ethanol. Then, the dispersion liquid is poured in a slight amount onto an aluminum foil and dried, and then observed with a SEM. Then, tens to hundreds pieces of the carbon nanotubes are arbitrarily selected in an observed image and are averaged by a publicly known data statistical processing method, to give the average length.

Specific examples of the carbon blacks include:

Asahi#120, Asahi#90, Asahi#78, Asahi#80, Asahi#80L, Asahi#75, Asahi#73, Asahi#70, SANBLACK900, SANBLACK300, SANBLACK200, SANBLACK905, SANBLACK305, SANBLACK215 and SANBLACKX15 manufactured by Asahi Carbon Co., Ltd.;

SpecialBlack550, SpecialBlack350, SpecialBlack250, SpecialBlack100 and SpecialBlack4 manufactured by Degussa;

MA100, MA220, MA230, #52, #57 and #45 manufactured by Mitsubishi Chemical Corporation;

BLACKPEARLS480 manufactured by Cabot Corporation;

SHOBLACK manufactured by Cabot Japan K.K.;

RAVEN410, RAVEN420, RAVEN450, RAVEN500 and UNIPUREBLACK LC902 manufactured by Columbian Carbon;

NITERON#300, NITERON#200H, NITERON#2001S and NITERON#200 manufactured by Nippon Techno-Carbon Co., Ltd.;

granular products of DENKABLACK FX-35 and HS-100 manufactured by Denki Kagaku Kogyo Kabushiki Kaisha; and SEAST9H, SEAST9, SEAST7HM, SEAST6, SEAST600, SEAST5H, TOKABLACK#8500M/F, TOKABLACK#8300M/F and TOKABLACK#7550SB/F manufactured by Tokai Carbon Co., Ltd.

On the other hand, specific examples of the carbon nanotubes include:

VGCF (trade name), VGCF-H (trade name), VGCF-S (trade name) and VGCF (trade name)-X manufactured by Showa Denko K.K.; and Meijo Arc APJ, Meijo Arc FH and Meijo Arc SO manufactured by Meijo Nano Carbon Co., Ltd.

As the black inorganic fine particles (e), those given hydrophobicity on the surface are preferable in view of improving light-shielding effect by improving dispersibility. In order to impart hydrophobicity to the surface, for example, a method can be mentioned in which the surface is coated with a hydrophobicity-imparting agent by treating the surface with one or more hydrophobicity-imparting agents selected from the group consisting of silicone resins, alkoxysilane resins, silane coupling agents, and higher aliphatic acid salts.

Examples of the hydrophobicity-imparting agents include:

higher aliphatic acid compounds such as higher aliphatic acid glyceryl, higher aliphatic acids, higher aliphatic acid polyvalent metal salts, and higher aliphatic sulfates polyvalent metal salts;

higher alcohols and derivatives thereof;

organofluorine compounds such as perfluorinated or partially fluorinated higher aliphatic acids and higher alcohols; and organosilicon compounds such as silicone resins, silane coupling agents, alkoxysilanes, chlorosilanes and silazanes. In particular, in view of practical effect, the silicone resins and silane coupling agents are preferable, and the silicone resins are more preferable.

As the silicone resins, for example, dimethylpolysiloxane, methylhydrogenpolysiloxane, and methylphenylpolysiloxane are preferable. In particular, dimethylpolysiloxane is preferable.

As the silane coupling agents, for example,

γ-acryloxypropyldimethylmethoxysilane,
γ-acryloxypropylmethyldimethoxysilane,
γ-methacryloxypropyldimethylmethoxysilane,
γ-methacryloxypropylmethyldimethoxysilane,
γ-acryloxypropyltrimethoxysilane,
γ-methacryloxypropyltrimethoxysilane,
phenyldimethylmethoxysilane,
phenylmethyldimethoxysilane,
phenyldiethylmethoxysilane,
phenylethyldimethoxysilane, and
phenyltrimethoxysilane are preferable. In particular, γ-acryloxypropyltrimethoxysilane, and phenyltrimethoxysilane are more preferable.

The surface-treatment method using the silicone resins or the silane coupling agents has no limitation, and can be, for example, any of a wet method and a dry method. However, preferable is the wet method, by which the surface of the particles becomes completely wet by the hydrophobicity-imparting agents and uniform surface-treatment can be carried out.

The amount of the hydrophobicity-imparting agent to be added may be such amount as to coat a part of or a whole of the surface of the black inorganic fine particles, an ingredient. The amount of the hydrophobicity-imparting agent to be added cannot be generalized, but the addition in an excessive amount uneconomically results in precipitation in more amount than the amount precipitated on the surface of the black inorganic fine particles. The amount of the hydrophobicity-imparting agent to be added is usually 0.5 to 20% by mass, preferably 0.5 to 10% by mass, more preferably 1 to 6% by mass, based on the black inorganic fine particles. When the addition amount is less than 0.5% by mass, the hydrophobicity may be low and the dispersibility may be insufficient. When the addition amount is more than 20% by mass, the resolution may be lowered.

The content of the black inorganic fine particles (e) in the hardening composition may be such amount as to ensure sufficient light-shielding effect and appropriately keep the fluidity of the hardening composition. Based on the entire black inorganic fine particles, the content is preferably 0.1 to 20% by mass, more preferably 0.5 to 15% by mass, still more preferably 1.0 to 12% by mass. When the black inorganic fine particles (e) are added in too large amount, the dispersion in the hardening composition may be disrupted and this may lead to inferior handling characteristics because of aggregation and significant viscosity increase. When the black inorganic fine particles (e) are added in too small amount, the light-shielding effect or electrical conductivity may be insufficient.

The hardening composition of the present invention may comprise, as needed, leveling agents, antioxidants, ultraviolet absorbents, solvents, pigments, fillers such as other inorganic fillers, reactive diluents, dispersants and other modifiers, as long as the characteristics such as the viscosity of the composition and the heat resistance of the hardened product are not impaired.

Examples of the leveling agents include polyether modified dimethylpolysiloxane copolymers, polyester modified, dimethylpolysiloxane copolymers, polyether modified methylalkylpolysiloxane copolymers, aralkyl modified methylalkylpolysiloxane copolymers, and polyether modified methylalkylpolysiloxane copolymers.

Examples of the fillers and the pigments include calcium carbonate, talc, mica, clay, Aerosil (trade name), and barium sulfate, aluminum hydroxide, zinc stearate, zinc oxide, red oxide and azo pigments.

Examples of the dispersants include:

SOLSPERSE 3000, SOLSPERSE 5000, SOLSPERSE 9000, SOLSPERSE 11200, SOLSPERSE 12000, SOLSPERSE 13240, SOLSPERSE 13650, SOLSPERSE 13940, SOLSPERSE 16000, SOLSPERSE 17000, SOLSPERSE 18000, SOLSPERSE 20000, SOLSPERSE 21000, SOLSPERSE 24000SC, SOLSPERSE 24000GR, SOLSPERSE 26000, SOLSPERSE 27000, SOLSPERSE 28000, SOLSPERSE 32000, SOLSPERSE 32500, SOLSPERSE 32550, SOLSPERSE 32600, SOLSPERSE 33000, SOLSPERSE 34750, SOLSPERSE 35100, SOLSPERSE 35200, SOLSPERSE 36000, SOLSPERSE 36600, SOLSPERSE 37500, SOLSPERSE 38500, SOLSPERSE 39000, SOLSPERSE 41000, SOLSPERSE 41090, SOLSPERSE 43000, SOLSPERSE 44000, SOLSPERSE 46000, SOLSPERSE 47000, SOLSPERSE 53095, SOLSPERSE 54000, SOLSPERSE 55000, SOLSPERSE 56000, SOLSPERSE 71000, SOLSPERSE 76500, SOLSPERSE X300, SOLPLUS C825, SOLPLUS D510, SOLPLUS D520, SOLPLUS D530, SOLPLUS D540, SOLPLUS DP310, SOLPLUS L300, SOLPLUS L400, SOLPLUS K200, SOLPLUS 210, SOLPLUS 500, SOLPLUS 700 and SOLPLUS 210 manufactured by Lubrizol Japan Limited;

Floren DOPA-15B, Floren DOPA-15B, Floren DOPA-15BHFS, Floren DOPA-17HF, Floren DOPA-22, Floren DOPA-33, Floren DOPA-44, Floren G-600, Floren G-700, Floren G-820, Floren G-900, Floren NC-500, Floren KDG-2400, Floren G-700AMP, Floren G-700DMEA, Floren WK-13E and Floren WK-20 manufactured by Kyoeisha Chemical Co., Ltd.; and AJISPER PE-821, AJISPER PB-822, AJISPER PB-880, AJISPER PN-411 and AJISPER PA-111 manufactured by Ajinomoto Fine-Techno Co., Inc.

In particular, those with low polarity are preferable, with specific examples including but not limited thereto SOLSPERSE 3000, SOLSPERSE 11200, SOLSPERSE 13650, SOLSPERSE 13940, SOLSPERSE 16000, SOLSPERSE 17000, SOLSPERSE 21000, Floren DOPA-15B, Floren DOPA-1513HFS, Floren G-600, Floren G-820, Floren G-900 and Floren NC-500. These dispersants can be used alone or in combination of two or more kinds.

The dispersant is added usually in an amount in terms of a solid matter of 5 wt % to 100 wt %, preferably 10 wt % to 80 wt %, more preferably 20 wt % to 60 wt %, based on the black inorganic fine particles. When the addition amount is less than 5 wt %, the dispersibility may be insufficient, and when the addition amount exceeds 100 wt %, properties of the hardened product may be significantly affected.

Containing these various components, the hardening composition of the present invention usually has a viscosity of 100 (rotation number: 4 rpm) to 20000 (rotation number: 0.4 rpm) mPa·s when being a resin composition having light-shielding effect alone, and usually has a viscosity of 500 (rotation number: 4 rpm) to 400000 (rotation number: 0.03 rpm) mPa·s when being a resin composition having both light-shielding effect and electrical conductivity. The viscosity herein is measured with a B-type viscometer ULTRA (manufactured by Brookfield Engineering Laboratories, Inc.) using a spindle No. 41 under the condition of 25° C. That is, the hardening composition of the present invention has extremely low viscosity even without containing a solvent, and has superior handling characteristics. This is attributed to high dispersion stability achieved by the surface-treated silica fine particles (a) and black inorganic fine particles (e).

<Method For Producing Hardening Composition>

The hardening composition of the present invention can be produced, for example, by sequentially carrying out:

the step (Step 1) of surface-treating the silica fine particles dispersed in an organic solvent with the silane compounds (f) and (g) to obtain the silica fine particles (a);

the step (Step 2) of having the (meth)acrylates (b) and (c) added to the silica fine particles (a) and uniformly mixed;

the step (Step 3) of distilling and desolvating the organic solvent and water from an uniformly mixed liquid of the silica fine particles (a) and the (meth)acrylates (b) and (c); and the step (Step 4) of having the polymerization initiator (d) and the black inorganic fine particles (e) added to a composition obtained through the distillation and desolvation, and uniformly mixed and dispersed to provide a hardening composition. Hereinafter, each step will be described.

(Step 1)

In Step 1, the silica fine particles are surface-treated with the silane compounds (f) and (g). The surface-treatment is carried out as follows. The organic solvent dispersion liquid of the silica fine particles are introduced into a reactor, and with stirring, the silane compounds (f) and (g) are added, and stirred and mixed. Then, water and a catalyst necessary to hydrolyzing the silane compounds are further added and stirred thereby to hydrolyze the silane compounds and carry out condensation polymerization on the surface of the silica fine particles.

As described later, it is preferable that the silica fine particles (a) are used with being dispersed in an organic solvent. On this account, the use of an organic solvent dispersion liquid of the silica fine particles in the surface-treatment can advantageously provide the silica fine particles (a) dispersed in the organic solvent. The organic solvent dispersion liquid of the silica fine particles can be produced by a publicly known method, or are commercially available as products such as SNOWTEX IPA-ST (manufactured by Nissan Chemical Industries, Ltd.)

The disappearance of the silane compounds through hydrolysis can be confirmed by gas chromatography. With a gas chromatography (manufactured by Agilent Technologies Japan, Ltd., 6850 type), the residue amount of the silica compounds can be measured by internal standard method in a hydrogen flame ionization detector, using a nonpolar column (manufactured by J&W Technology, Ltd.), at a temperature of 50 to 300° C., raising temperature at a rate of 10° C./min, and using He as a carrier gas at a flow rate of 1.2 cc/min, whereby the disappearance of the silane compounds through hydrolysis can be confirmed.

As described above, in the surface-treatment of the silica fine particles, the silane compound (f) is usually used in an amount of 5 to 25 parts by mass, preferably 10 to 20 parts by mass, more preferably 12 to 18 parts by mass, based on 100 parts by mass of the silica fine particles which have not been surface-treated. The silane compound (g) is usually used in an amount of 5 to 25 parts by mass, preferably 10 to 20 parts by mass, more preferably 12 to 18 parts by mass, based on 100 parts by mass of the silica fine particles which have not been surface-treated.

The minimum amount of water necessary to carry out the hydrolysis is one time the sum of the mol number of an alkoxy group and the mol number of a hydroxyl group bonded to the silane compounds (f) and (g). The maximum amount is ten times thereof. When the amount of water is excessively small, the hydrolysis speed is extremely low, which may be uneconomical and lead to insufficient surface-treatment. Conversely, when the amount of water is excessively large, the silica fine particles (a) may form a gel.

The hydrolysis reaction usually involves the use of a catalyst for the hydrolysis reaction. Specific examples of such catalysts include:

inorganic acids such as hydrochloric acid, acetic acid, sulfuric acid and phosphoric acid;

organic acids such as formic acid, propionic acid, oxalic acid, para toluene sulfonic acid, benzoic acid, phthalic acid, and maleic acid;

alkali catalysts such as potassium hydroxide, sodium hydroxide, calcium hydroxide, and ammonia;

organic metals;

metal alkoxides;

organic tin compounds such as dibutyltin dilaurate, dibutyltin dioctylate, and dibutyltin diacetate;

metal chelate compounds such as aluminumtris(acetylacetonate), titaniumtetrakis(acetylacetonate),
titaniumbis(butoxy)bis(acetylacetonate),
titaniumbis(isopropoxy)bis(acetylacetonate),
zirconiumbis(butoxy)bis(acetylacetonate), and
zirconiumbis(isopropoxy)bis(acetylacetonate); and boron compounds such as boron butoxide and boric acid.

Of these, in view of achieving solubility in water and sufficient hydrolysis speed, hydrochloric acid, acetic acid, maleic acid and boron compounds are preferable. These catalysts can be used alone or in combination of two or more kinds.

In Step 1, the hydrolysis reaction of the silane compounds (f) and (g) may involve the use of non water soluble catalysts, but preferably involves the use of water soluble catalysts. The use of water soluble catalysts for hydrolysis reaction is preferable because when the water soluble catalyst is dissolved in an appropriate amount of water and added into a reaction system, the catalyst can be uniformly dispersed.

The addition amount of the catalyst used for hydrolysis reaction is not particularly limited, but is usually 0.1 to 20 parts by mass, preferably 0.5 to 5 parts by mass, based on 100 parts by mass of the silica fine particles. If the surface-treatment of the silica fine particles involves the use of an organic solvent dispersion liquid of the silica fine particles, the aforementioned mass of the silica fine particles refers only to the mass of the silica particles per se dispersed in the organic solvent.

The reaction temperature in the hydrolysis reaction is not particularly limited, but is usually in the range of 10 to 80° C., preferably in the range of 20 to 50° C. When the reaction temperature is excessively low, the hydrolysis speed is extremely low, which may be uneconomical and lead to insufficient surface-treatment. When the reaction temperature is excessively high, the gelation reaction tends to take place.

The reaction time for carrying out the hydrolysis is not particularly limited, but is usually in the range of 10 minutes to 48 hours, preferably in the range of 30 minutes to 24 hours.

In Step 1, the surface-treatment may be carried out by successively using the silane compound (f) and the silane compound (g), but is preferably carried out by using both at a time in a single stage in view of making the reaction process simplified and efficient.

(Step 2)

A method for mixing the silica fine particles (a) and the (meth)acrylates (b) and (c) is not particularly limited, but for example, there can be mentioned a method in which the mixing involves the use of mixing machines such as a mixer, a ball mill and a triple roll mill under room temperature condition or under heating condition; and a method in which, in the reactor where Step 1 was carried out, with continuous stirring, the (meth)acrylates (b) and (c) are added and mixed.

The silica fine particles (a) are preferably silica fine particles dispersed in an organic solvent in view of the dispersibility in the hardening composition. The organic solvents are preferably those capable of dissolving organic components contained in the hardening composition (such as the later-mentioned (meth)acrylate (b) and (meth)acrylate (c)).

Examples of the organic solvents include alcohols, ketones, esters, and glycol ethers. Because of the easiness of the desolvation in the later-mentioned desolvation step in which the organic solvent is removed from the mixed liquid of the silica fine particles (a) and the (meth)acrylate (b) and the (meth)acrylate (c), preferable are alcohol organic solvents such as methanol, ethanol, isopropylalcohol, butylalcohol, and n-propylalcohl; and ketone organic solvents such as methylethylketone and methylisobutylketone.

Of these, isopropylalcohol is particularly preferable. When the silica fine particles (a) dispersed in isopropylalcohol are used, the hardening composition after desolvation has lower viscosity than when other solvents are used, and thus a hardening composition having low viscosity can be stably prepared.

(Step 3)

In Step 3, in order to distill and desolvate (hereinafter, these are collectively referred to as desolvation) an organic solvent and water from the uniformly mixed liquid of the silica fine particles (a) and the (meth)acrylates (b) and (c), the mixed liquid is preferably heated under reduced pressure.

The temperature is preferably kept at 20 to 100° C. In view of the balance between the prevention of aggregation and gelation and desolvation speed, the temperature is more preferably 30 to 70° C., still more preferably 30 to 50° C. When the temperature is too high, the hardening composition may have considerably lowered fluidity or become gelled.

The vacuum degree in reducing pressure is usually 10 to 4000 kPa. In view of achieving the balance between desolvation speed and the prevention of aggregation and gelation, the vacuum degree is more preferably 10 to 1000 kPa, most preferably 10 to 500 kPa. When a value of the vacuum degree is too large, the desolvation speed is extremely low, which is uneconomical.

Preferably, the composition after the desolvation has substantially no solvent. The word "substantially" herein means that the actual production of a hardened product using the hardening composition of the present invention does not require another desolvation step. This means specifically that the residue amount of the organic solvent and water in the hardening composition is preferably 1% by mass or less, preferably 0.5% by mass or less, more preferably 0.1% by mass or less.

In Step 3, prior to the desolvation, 0.1 part by mass or less of a polymerization inhibitor may be added based on 100 parts by mass of the composition after the desolvation. The polymerization inhibitor is used to prevent the polymerization reaction of the components in the hardening composition during and after the desolvation step and during the storage of the composition. Examples of the polymerization inhibitor include hydroquinone, hydroquinonemonomethylether, benzoquinone, p-t-butylcatechol, and 2,6-di-t-butyl-4-methylphenol. These can be used alone or in combination of two or more kinds.

Step 3 may be carried out in apparatus prepared solely for this step after the uniformly mixed liquid of the silica fine particles (a) and (meth)acrylates (b) and (c) which experienced Step 2 is transferred to the apparatus. Alternatively, when Step 2 was carried out in the reactor where Step 1 was carried out, Step 3 can be carried out in the same reactor where Step 2 was carried out.

(Step 4)

A method for having the polymerization initiator (d) and the black inorganic fine particles (e) added to a composition obtained through the distillation and desolvation, and uniformly mixed and dispersed is not particularly limited. However, for example, there can be mentioned a method in which the mixing is carried out at room temperature with a mixing machine such as a mixer, a ball mill and a triple roll mill; a method in which in a reactor where Steps 1 to 3 were carried out, with continuous stirring, the polymerization initiator (d) is added and mixed, and separately, the black inorganic fine particles (e) are added thereto, and the mixing is carried out at room temperature with a mixing machine such as a mixer, a ball mill, a triple roll mill and a bead mill; and a method in which the black inorganic fine particles (e) are added to the composition obtained by carrying out Steps 1 to 3, and are mixed at room temperature with a mixing machine such as a mixer, a ball mill, a triple roll mill and a bead mill, and then the polymerization initiator (d) is added and mixed.

The hardening composition obtained by having the polymerization initiator (d) and the black inorganic fine particles (e) added, mixed and dispersed may be filtrated as needed. The filtration is carried out to remove foreign substance such as rubbish in the hardening composition. A filtration method is not particularly limited, but preferable is a pressure filtration method using a filter of a membrane type, a cartridge type or the like with a pressure filtration pore diameter of 1.0 µm.

Via the above respective steps, the hardening composition of the present invention can be produced. The hardening composition of the present invention contains the silica fine particles (a), a structural component, treated with the specific silane compounds, and therefore even without containing a solvent, has low viscosity and superior handling characteristics.

The hardening composition of the present invention, by being hardened, becomes a hardened product which can be used as a light-shielding component for various optical equipments such as a camera, a video camera, a copying machine and a developing machine. In addition, the composition, if used alone as it is, can be applied to a hardening black resin composition for ink jet used to produce a color filter by ink jet method.

<Method For Producing Hardened Product>

By hardening the hardening composition of the present invention, the hardened product is obtained. As a hardening method, there can be mentioned, for example, a method in which active energy ray is applied so that the ethylenically unsaturated groups of the (meth)acrylates (b) and (c) are crosslinked; and a method in which heat is applied so that the ethylenically unsaturated groups are heat polymerized. These methods can be combined.

If the hardening composition is hardened by active energy ray such as ultraviolet, the photopolymerization initiator is incorporated into the hardening composition in the above Step 4. If the hardening composition is hardened by heating, the heat polymerization initiator is incorporated into the hardening composition in the above Step 4. If the photo-hardening and the heat-hardening are carried out in combination, both the photopolymerization initiator and the heat polymerization initiator are incorporated in the above Step 4.

The hardened product of the present invention can be obtained, for example, by applying the hardening composition of the present invention on the surface of a glass plate, a plastic plate, a metal plate, a silicon wafer or an electronic equipment component made by combining these materials, and by active energy ray or by heating. The hardening may be carried out both by active energy ray and by heating.

As a method for applying the hardening composition, for example, there can be mentioned a coating with a bar coater, an applicator, a die coater, a spin coater, a spray coater, a curtain coater, a roll coater or the like; coating by screen printing; and coating by dipping.

The amount of the hardening composition of the present invention to be applied on the substrate is not particularly limited and can be controlled appropriately in accordance with a purpose. In view of moldability, the amount is preferably such that a coating film obtained after hardening treatment by active energy ray and/or by heating will have a film thickness of 10 µm to 5 mm, and the amount is more preferably such that the film thickness will be 20 µm to 3 mm.

If the hardening composition of the present invention is hardened by active energy ray, the active energy ray used for hardening is preferably an electron ray and a light with a wavelength ranging from ultraviolet region to infrared region. Regarding a light source that can be used, a light source for ultraviolet is, for example, an ultra-high pressure mercury light source and a metal halide light source; and a light source for visible light is, for example, a metal halide light source and a halogen light source; and a light source for infrared ray is, for example, a halogen light source. In addition thereto, further examples include a light source such as laser and LED.

The hardening by active energy ray may be, as needed, followed by further hardening through heat treatment (annealing treatment). In this case, the heating temperature is preferably in the range of 80 to 200° C. The heating time is preferably in the range of 10 minutes to 60 minutes.

If the hardening composition of the present invention is hardened by heat treatment, the heating temperature is preferably in the range of 80 to 200° C., more preferably in the range of 100 to 150° C. When the heating temperature is lower than 80° C., the heating is necessary for longer time, which tends to be uneconomical. When the heating temperature is higher than 200° C., in addition to higher energy cost, more time is needed to raise temperature and lower temperature, which tends to be uneconomical.

The hardening of the hardening composition by heat polymerization may be, as needed, followed by further hardening through heat treatment (annealing treatment). In this case, the heating temperature is preferably in the range of 150 to 200° C. The heating time is preferably in the range of 5 minutes to 60 minutes.

<Hardened Product>

The hardened product of the present invention is excellent in light-shielding effect, heat resistance and molding processability, and therefore can be used for a light-shielding component, e.g., a light-shielding film, for various optical equipments such as a camera, a video camera, a copying machine and a developing machine.

The hardened product of the present invention is obtained by hardening the hardening composition containing the (meth)acrylates (b) and (c) with a high glass transition temperature of the homopolymer, and therefore has excellent heat resistance.

The hardened product of the present invention has excellent heat resistance: when the hardened product is heated in nitrogen atmosphere, the 5% weight loss temperature is usually 280° C. or higher, preferably 300° C. or higher, more preferably 320° C. or higher. When the 5% weight loss temperature in heating is lower than 280° C., for example, in a case where this hardened product is used for an active matrix display element substrate, the production process thereof may have problems such as warpage and deflection, or possibly cracks, or contamination of apparatus because of increased emission gas component in high-temperature treatment.

The hardened product of the present invention has excellent light-shielding effect. The light-shielding effect can be evaluated by using optical density (OD value). The optical density depends on the thickness of a hardened film and the content of fine particles. Thus, depending on optical density to be targeted, the film thickness or the content of the black inorganic fine particles needs to be controlled. The hardened product obtained from the hardening composition of the present invention can be used for a light-shielding component for various optical equipments such as a camera, a video camera, a copying machine and a developing machine. The optical density required for these uses is 1.0 or higher, preferably 2.0 or higher, more preferably 4.0 or higher. When the optical density is below 1.0, the light-shielding effect may be insufficient.

EXAMPLES

Hereinafter, the present invention will be described in detail with reference to Examples, but the present invention is not limited to the following Examples as long as not missing the gist.

Example 1

Preparation of Hardening Composition

Into a separable flask, 100 parts by mass of an isopropyl alcohol dispersion type colloidal silica (the silica content: 30% by mass, the average particle diameter: 10 to 20 nm, product name: SNOWTEX IPA-ST, manufactured by Nissan Chemical Industries, Ltd.) was charged. Then, into the separable flask, 4.5 parts by mass of γ-methacryloxypropyltrimethoxysilane and 4.5 parts by mass of phenyltrimethoxysilane were added, and stirred and mixed. Further, 2.9 parts by mass of 0.1825% by mass HCl solution was added, and stirred at 20° C. for 24 hours. The silica, fine particles were in this way surface-treated to provide a dispersion liquid of the silica fine particles (a).

The disappearance of γ-methacryloxypropyltrimethoxysilane and phenyltrimethoxysilane through hydrolysis was confirmed by gas chromatography (manufactured by Agilent Technologies Japan, Ltd., 6850 type). The measurement was carried out by internal standard method in a hydrogen flame ionization detector, using a nonpolar column (manufactured by J&W Technology, Ltd.), at a temperature of 50 to 300° C., by raising temperature at a rate of 10° C./min, and using He as a carrier gas at a flow rate of 1.2 cc/min. Eight hours after the HCl solution was added, phenyltrimethoxysilane and γ-methacryloxypropyltrimethoxysilane disappeared.

Then, into 100 parts by mass of the dispersion liquid of the silica fine particles (a), 22.5 parts by mass of trimethylolpropanetriacrylate (product name: Viscoat #295, manufactured by Osaka Organic Chemical Industries Ltd., Tg of the homopolymer: >250° C.) and 22.5 parts by mass of adamantylmathacrylate (product name: ADMA, manufactured by Osaka Organic Chemical Industries Ltd., Tg of the homopolymer: 180° C.) were added and uniformly mixed. Thereafter, with stirring, a volatile content was removed by heating under reduced pressure at 40° C. and 100 kPa thereby to obtain a silica dispersion resin composition. The amount of the volatile content removed was 72.4 parts by mass.

Subsequently, to 95 parts by mass of the silica dispersion resin composition, as the black inorganic fine particles, 5 parts by mass of carbon blacks surface-treated with dimethylpolysiloxane (a granular product of DENKABLACK treated with dimethylpolysiloxane, product name: SI06-5, manufactured by Daito Kasei Kogyo Co., Ltd., the number average particle diameter: 30 to 50 nm) was added and the mixture was kneaded with a planetary mixer thereby to completely disperse the carbon blacks, whereby a light-shielding resin composition 1 was obtained.

The surface-treatment of the carbon blacks with dimethylpolysiloxane was carried out by the following method. Into 100 g of the carbon blacks put in and flown with a 1 L Henschel mixer, a solution prepared by dissolving 5 g of dimethypolysiloxane (manufactured by Shin-Etsu Chemical Co., Ltd., KF96-100CS) in 100 g of isopropylalcohol was added dropwise and mixed. Thereafter, isopropylalcohol was removed by vacuum drying at 80° C. The residue was further heated at 180° C. for 4 hours and then air-cooled to room temperature thereby to prepare surface-treated carbon blacks.

Further, with 100 parts by mass of the light-shielding resin composition 1, as the photopolymerization initiator, 4 parts by mass of diphenyl (2,4,6-trimethylbenzoyl)phosphineoxide (product name: Speedcure TPO-L, manufactured by Nihon Siber Hegner K. K.), and, as the heat polymerization initiator, 1 part by mass of t-butylperoxy(2-ethylhexanoate) (product name: PERBUTYL 0, manufactured by NOF Corporation) were mixed thereby to obtain a hardening composition 1 (BR-1).

The hardening composition 1 obtained was found to have a viscosity of 300000 mPa·s. The viscosity was measured with a B-type viscometer DV-III ULTRA (manufactured by Brookfield Engineering Laboratories, Inc.) using a spindle No. 41 at a rotation number of 0.05 rpm, at 25° C.

The composition of components used to prepare the hardening composition 1 is set forth in the following Table 1.

[Preparation of Hardened Film]
<Active Energy Ray Hardening and Heat Hardening>

The hardening composition 1 was applied on a substrate, using a spacer of 200 μm. Then, the front face and the back face each had a glass plate put thereon. The coating film was irradiated with an irradiating device equipped with an ultra-high pressure mercury lamp at 3 J/cm$^2$ thereby to be hardened. Thereafter, further heat treatment was carried out at 120° C. for 9 minutes thereby to completely harden the coating film.

This hardened film was used to evaluate the following properties. The result thereof is set forth in Table 2.

[Property Evaluation Method]
<Molding Processability>

The hardened film was evaluated based on the following criteria which indicates the extent to which the hardened film, when peeled from a glass substrate, can be processed without fractures or cracks.

A: the hardened film can be processed (peeled) without fractures and cracks.

B: the hardened film has no fractures, but partially has cracks.

C: the hardened film has cracks with poor processability (peelability).

<Light-Shielding Effect>

All light transmittance (%) of the hardened film obtained was measured with the use of a Color, Oil & Haze Measuring Instrument (manufactured by Nippon Denshoku Industries, Co., Ltd., COH400), and from a value obtained, an OD value was calculated and the light-shielding effect was evaluated based on the following criteria.

A: all light transmittance≦0.01% (OD value≧4)
B: 0.01%<all light transmittance≦1% (4>OD value≧2)
C: 1%<all light transmittance≦10% (2>OD value≧1)
D: all light transmittance>10% (OD value<1)<

<Heat Resistance Form Stability>

The hardened film obtained was heated at 270° C. for 1 minute, and was allowed to cool down at room temperature for 1 minute. This step was repeated three times, and thereafter, the form stability of the hardened product was evaluated based on the following criteria.

A: the hardened product has no warpage, and the hardened film is not broken.

B: the hardened product has warpage of 1 mm or less per 5 cm, but the hardened film is not broken.

C: the hardened product has warpage of more than 1 mm and 5 mm or less per 5 cm, but the hardened film is not broken.

D: the hardened product has warpage of more than 5 mm per 5 cm, or the hardened film is broken.

<5% Weight Loss Temperature>

The hardened film obtained was treated with the use of TG-DTA (manufactured by SEIKO Electronics Industries, Co., Ltd.) in nitrogen atmosphere at temperatures ranging from 20° C. to 500° C., by raising temperature at a rate of 10° C./min, whereby the 5% weight loss temperature was obtained. The hardened film with a higher value of the 5% weight loss temperature represents a hardened film with superior heat resistance.

Example 2

Preparation of Hardening Composition

The same procedure as in Example 1 was repeated except that trimethylolpropanetriacrylate was added in an amount of 50 parts by mass and adamantylmethacrylate was added in an amount of 10 parts by mass, whereby a hardening composition 2 (BR-2) was obtained.

The composition of components used to prepare the hardening composition 2 is set forth in the following Table 1.

[Preparation of Hardened Film]

As in Example 1, the hardening composition 2 was hardened by active energy ray and by heating thereby to obtain a hardened film.

This hardened film was used to evaluate the properties as in Example 1. The result thereof is set forth in Table 2.

Example 3

Preparation of Hardening Composition

The same procedure as in Example 1 was repeated except that adamantylmethacrylate was changed to dicyclopentadienylmethacrylate (product name: FA-513M, manufactured by Hitachi Chemical, Co., Ltd., Tg of the homopolymer: 175° C.), whereby a hardening composition 3 (BR-3) was obtained.

The composition of components used to prepare the hardening composition 3 is set forth in the following Table 1.

[Preparation of Hardened Film]

As in Example 1, the hardening composition 3 was hardened by active energy ray and by heating thereby to obtain a hardened film.

This hardened film was used to evaluate the properties as in Example 1. The result thereof is set forth in Table 2.

Example 4

Preparation of Hardening Composition

The same procedure as in Example 1 was repeated except that the light-shielding resin composition was constituted of 98 parts by mass of the silica dispersion resin composition and 2 parts by mass of the black inorganic fine particles, whereby a hardening composition 4 (BR-4) was obtained.

The composition of components used to prepare the hardening composition 4 is set forth in the following Table 1.

[Preparation of Hardened Film]

As in Example 1, the hardening composition 4 was hardened by active energy ray and by heating thereby to obtain a hardened film.

This hardened film was used to evaluate the properties as in Example 1. The result thereof is set forth in Table 2.

Example 5

Preparation of Hardening Composition

The same procedure as in Example 1 was repeated except that the photopolymerization initiator was not used, whereby a hardening composition 5 (BR-5) was obtained.

The composition of components used to prepare the hardening composition 5 is set forth in the following Table 1.
[Preparation of Hardened Film]
<Heat Hardening>

The hardening composition 5 was applied on a substrate, using a spacer of 200 μm. Then, the front face and the back face each had a glass plate put thereon. The coating film was subjected to heat treatment at 120° C. for 9 minutes and completely hardened.

The hardened film obtained was used to evaluate the properties as in Example 1. The result thereof is set forth in Table 2.

Example 6

Preparation of Hardening Composition

The same procedure as in Example 2 was repeated except that the photopolymerization initiator was not used, whereby a hardening composition 6 (BR-6) was obtained.

The composition of components used to prepare the hardening composition 6 is set forth in the following Table 1.
[Preparation of Hardened Film]

As in Example 5, the hardening composition 6 was hardened by heating, thereby to obtain a hardened film.

The hardened film obtained was used to evaluate the properties as in Example 1. The result thereof is set forth in Table 2.

Example 7

Preparation of Hardening Composition

The same procedure as in Example 3 was repeated except that the photopolymerization initiator was not used, whereby a hardening composition 7 (BR-7) was obtained.

The composition of components used to prepare the hardening composition 7 is set forth in the following Table 1.
[Preparation of Hardened Film]
As in Example 5, the hardening composition 7 was hardened by heating, thereby to obtain a hardened film.

The hardened film obtained was used to evaluate the properties as in Example 1. The result thereof is set forth in Table 2.

Example 8

Preparation of Hardening Composition

The same procedure as in Example 4 was repeated except that the photopolymerization initiator was not used, whereby a hardening composition 8 (BR-8) was obtained.

The composition of components used to prepare the hardening composition 8 is set forth in the following Table 1.
[Preparation of Hardened Film]
As in Example 5, the hardening composition 8 was hardened by heating, thereby to obtain a hardened film.

The hardened film obtained was used to evaluate the properties as in Example 1. The result thereof is set forth in Table 2.

Example 9

Preparation of Hardening Composition

The same procedure as in Example 5 was repeated except that the composition was as shown in Table 1, whereby a hardening composition 9 (BR-9) was obtained. The composition of components used to prepare the hardening composition 9 is set forth in the following Table 1.
[Preparation of Hardened Film]
The hardening by heating was carried out as in Example 5 except that the heating temperature and the heating time were changed to 130° C. and 16 minutes, respectively, thereby to obtain a hardened film.

The hardened film obtained was used to evaluate the properties as in Example 1. The result thereof is set forth in Table 2.

Example 10

Preparation of Hardening Composition

The same procedure as in Example 5 was repeated except that the composition was as shown in Table 1, whereby a hardening composition 10 (BR-10) was obtained. The composition of components used to prepare the hardening composition 10 is set forth in the following Table 1.
[Preparation of Hardened Film]
The hardening composition 10 was hardened by heating as in Example 5 to obtain a hardened film.

The hardened film obtained was used to evaluate the properties as in Example 1. The result thereof is set forth in Table 2.

Example 11

Preparation of Hardening Composition

The same procedure as in Example 9 was repeated except that the composition was as shown in Table 1, whereby a hardening composition 11 (BR-11) was obtained. The composition of components used to prepare the hardening composition 11 is set forth in the following Table 1.
[Preparation of Hardened Film]
The hardening composition 11 was hardened by heating as in Example 5 to obtain a hardened film.

The hardened film obtained was used to evaluate the properties as in Example 1. The result thereof is set forth in Table 2.

Comparative Example 1

Preparation of Hardening Composition

The same procedure as in Example 9 was repeated except that trimethylolpropanetriacrylate and adamantylmethacrylate were replaced with adamantylmethacrylate alone, whereby a hardening composition 12 (BR-12) was obtained. The composition of components used to prepare the hardening composition 12 is set forth in the following Table 1.
[Preparation of Hardened Film]
During the preparation, the composition became gelled, and a hardened film could not be prepared.

Comparative Example 2

Preparation of Hardening Composition

The same procedure as in Example 9 was repeated except that trimethylolpropanetrimethacrylate and adamantylmethacrylate were replaced with trimethylolpropanetrimethacrylate alone, whereby a hardening composition 13 (BR-13) was obtained. The composition of components used to prepare the hardening composition 13 is set forth in the following Table 1.

[Preparation of Hardened Film]

The hardening composition 11 was hardened by heating at the same heating temperature for the same heating time as in Example 9 thereby to obtain a hardened film.

The hardened film obtained was used to evaluate the properties as in Example 1. The result thereof is set forth in Table 2.

Comparative Example 3

Preparation of Hardening Composition

The same procedure as in Example 9 was repeated except that the silica fine particles were not used and the composition was as shown in Table 1, whereby a hardening composition 14 (BR-14) was obtained. The composition of components used to prepare the hardening composition 14 is set forth in the following Table 1.

[Preparation of Hardened Film]

The hardening by heating at the same heating temperature for the same heating time as in Example 9 was attempted, but it was impossible to obtain a hardened film capable of being evaluated.

All of the hardened products obtained in Examples 1 to 11 showed superior molding processability, light-shielding effect and heat resistance. It is believed that the heat resistance is attributed to the superior crosslinking structure constructed by the inorganic particles and the monomers contained in the composition. It is believed that the light-shielding effect results from the balance of the composition contributing to the superior dispersion of the black inorganic fine particles.

Example 12

Preparation of Electrically-Conductive Hardening Composition

Into a separable flask, 125.3 parts by mass of an isopropyl alcohol dispersion type colloidal silica (the silica content: 30% by mass, the average particle diameter: 10 to 20 nm, product name: SNOWTEX IPA-ST, manufactured by Nissan Chemical Industries, Ltd.) was charged. Then, into the separable flask, 6.8 parts by mass of γ-methacryloxypropyltrimethoxysilane and 4.5 parts by mass of phenyltrimethoxysilane were added, and stirred and mixed. Further, 3.6 parts by mass of 0.1825% by mass HCl solution was added, and stirred at 20° C. for 24 hours. The silica fine particles were in this way surface-treated to provide a dispersion liquid of the silica fine particles (a).

The disappearance of γ-methacryloxypropyltrimethoxysilane and phenyltrimethoxysilane through hydrolysis was confirmed by gas chromatography (manufactured by Agilent Technologies Japan, Ltd., 6850 type). The measurement was carried out by internal standard method in a hydrogen flame ionization detector, using a nonpolar column (manufactured by J&W Technology, Ltd.), at a temperature of 50 to 300° C., by raising temperature at a rate of 10° C./min, and using He as a carrier gas at a flow rate of 1.2 cc/min. Eight hours after the HCl solution was added, phenyltrimethoxysilane and γ-methacryloxypropyltrimethoxysilane disappeared.

Then, into 100 parts by mass of the dispersion liquid of the silica fine particles (a), 28.2 parts by mass of trimethylolpropanetriacrylate (product name: Viscoat #295, manufactured by Osaka Organic Chemical Industries Ltd., Tg of the homopolymer: >250° C.) and 28.2 parts by mass of adamantylmathacrylate (product name: ADMA, manufactured by Osaka Organic Chemical Industries Ltd., Tg of the homopolymer: 180° C.) were added and uniformly mixed. Thereafter, with stirring, a volatile content was removed by heating under reduced pressure at 40° C. and 100 kPa thereby to obtain a silica dispersion resin composition. The amount of the volatile content removed was 90.5 parts by mass.

Subsequently, to 96 parts by mass of the silica dispersion resin composition, as the black inorganic fine particles, 4 parts by mass of carbon nanotubes (product name: VGCF (trade name); manufactured by Showa Denko K.K., the average diameter: 150 nm, the average length: 8 μm) was added and kneaded with a planetary mixer thereby to completely disperse the carbon nanotubes, whereby a light-shielding resin composition 15 was obtained.

Further, with 100 parts by mass of this light-shielding resin composition 15, as the heat polymerization initiator, 1 part by mass of t-butylperoxy(2-ethylhexanoate) (product name: PURBUTYL O; manufactured by NOF Corporation) was mixed, whereby a hardening composition 15 (BR-15) at a paste state was obtained. The composition of components used to prepare the hardening composition 15 is set forth in the following Table 3.

[Preparation of Hardened Film]

The hardening composition 15 was hardened by heating at the same heating temperature for the same heating time as in Example 9 thereby to obtain a hardened film.

The hardened film obtained was used to evaluate the properties as in Example 1, and to measure the volume resistivity for the evaluation of the electrical conductivity. The evaluation result thereof is set forth in Table 4.

A method for measuring the volume resistivity is as follows.

<Volume Resistivity>

The hardened film was prepared on a glass substrate. On the hardened film, a silver paste (product name: Dotite D-550, manufactured by Fujikurakasei Co., Ltd.) was applied to prepare measurement points. Then, a resistance value between two points was measured with a resistance meter, and converted in terms of the volume between the measurement points, thereby to obtain a volume resistivity.

The volume resistivities of the hardened films prepared from the hardening compositions 1 to 11 obtained in Examples 1 to 11 were also measured by the above method. The evaluation results thereof are set forth in Table 4.

Example 13

Preparation of Hardening Composition

The same procedure as in Example 12 was repeated except that the carbon nanotubes (product name: VGCF (trade name); manufactured by Showa Denko K.K.) were changed to carbon nanotubes (product name: VGCF (trade name)-H; manufactured by Showa Denko K.K., the average diameter: 150 nm, the average length: 6 μm), whereby a hardening composition 16 (BR-16) was obtained.

The composition of components used to prepare the hardening composition 16 is set forth in the following Table 3.

[Preparation of Hardened Film]

The hardening composition 16 was hardened by heating as in Example 12 thereby to obtain a hardened film.

The hardened film obtained was used to evaluate the properties as in Example 12. The result thereof is set forth in Table 4.

Example 14

Preparation of Hardening Composition

The same procedure as in Example 12 was repeated except that the carbon nanotubes (product name: VGCF (trade name); manufactured by Showa Denko K. K.) were changed to carbon nanotubes (product name: VGCF (trade name)-S; manufactured by Showa Denko K.K., the average diameter: 80 nm, the average length: 10 μm), whereby a hardening composition 17 (BR-17) was obtained. The composition of components used to prepare the hardening composition 17 is set forth in the following Table 3.

[Preparation of Hardened Film]

The hardening composition 17 was hardened by heating as in Example 12 thereby to obtain a hardened film.

The hardened film obtained was used to evaluate the properties as in Example 12. The result thereof is set forth in Table 4.

Example 15

Preparation of Hardening Composition

The same procedure as in Example 12 was repeated except that the carbon nanotubes (product name: VGCF (trade name); manufactured by Showa Denko K. K.) were changed to carbon nanotubes (product name: Meijo-ArcAP-J; manufactured by Meijo Nano Carbon Co., Ltd., the average diameter: 1.4 nm, the average length: 5 μm), whereby a hardening composition 18 (BR-18) was obtained. The composition of components used to prepare the hardening composition 18 is set forth in the following Table 3.

[Preparation of Hardened Film]

The hardening composition 18 was hardened by heating as in Example 12 thereby to obtain a hardened film.

The hardened film obtained was used to evaluate the properties as in Example 12. The result thereof is set forth in Table 4.

Example 16

Preparation of Hardening Composition

The same procedure as in Example 12 was repeated with the similar composition as in Example 9 except that the carbon blacks in Example 9 were changed to carbon nanotubes (product name: VGCF (trade name)-H; manufactured by Showa Denko K.K.), the average diameter: 150 nm, the average length: 6 μm), whereby a hardening composition 19 (BR-19) was obtained. The composition of components used to prepare the hardening composition 19 is set forth in the following Table 3.

[Preparation of Hardened Film]

The hardening composition 19 was hardened by heating as in Example 12 thereby to obtain a hardened film.

The hardened film obtained was used to evaluate the properties as in Example 12. The result thereof is set forth in Table 4.

Example 17

Preparation of Hardening Composition

The same procedure as in Example 12 was repeated with the similar composition as in Example 16 except that the trimethylolpropanetrimethacrylate in Example 16 was changed to dipentaerythritolhexaacrylate, whereby a hardening composition 20 (BR-20) was obtained. The composition of components used to prepare the hardening composition 20 is set forth in the following Table 3.

[Preparation of Hardened Film]

The hardening composition 20 was hardened by heating as in Example 12 thereby to obtain a hardened film.

The hardened film obtained was used to evaluate the properties as in Example 12. The result thereof is set forth in Table 4.

Example 18

Preparation of Hardening Composition

The same procedure as in Example 12 was repeated with the similar composition as in Example 16 except that the trimethylolpropanetrimethacrylate in Example 16 was changed to pentaerythritoltriacrylate, whereby a hardening composition 21 (BR-21) was obtained. The composition of components used to prepare the hardening composition 21 is set forth in the following Table 3.

[Preparation of Hardened Film]

The hardening composition 21 was hardened by heating as in Example 12 thereby to obtain a hardened film.

The hardened film obtained was used to evaluate the properties as in Example 12. The result thereof is set forth in Table 4.

Comparative Example 4

Preparation of Hardening Composition

The same procedure as in Example 16 was repeated except that trimethylolpropanetrimethacrylate and adamantylmethacrylate were replaced with adamantylmethacrylate alone. During the synthesis, however, the composition became gelled and an intended hardening composition 22 (BR-22) could not be obtained. The composition of components used to prepare the hardening composition 22 is set forth in the following Table 3.

Comparative Example 5

Preparation of Hardening Composition

The same procedure as in Example 16 was repeated except that trimethylolpropanetrimethacrylate and adamantylmethacrylate were replaced with trimethylolpropanetrimethacrylate alone. The composition of components used to prepare the hardening composition 23 is set forth in the following Table 3.

[Preparation of Hardened Film]

The hardening composition 23 was hardened by heating as in Example 16 thereby to obtain a hardened film.

The hardened film obtained was used to evaluate the properties as in Example 16. The result thereof is set forth in Table 4.

Comparative Example 6

Preparation of Hardening Composition

The same procedure as in Example 16 was repeated except that the silica fine particles were not used and the same composition as shown in Table 3 was used, whereby a hardening composition 24 (BR-24) was obtained. The composition of components used to prepare the hardening composition 24 is set forth in the following Table 3.

[Preparation of Hardened Film]

The hardening by heating of the hardening composition 24 was attempted as in Example 16, but the composition was not hardened at all, and a hardened film could not be obtained.

All of the hardened products obtained in Examples 12 to 18 showed superior molding processability, light-shielding effect, heat resistance and electrical conductivity. The reason why the superior heat resistance and light-shielding effect were obtained is as described with regard to result indicated in the Table 2. It is believed that the superior electrical conductivity was achieved by superior dispersion of the carbon nanotubes in the composition system resulting in the formation of the conductive circuit.

TABLE 1

| | | | Example 1 | Example 2 | Example 3 | Example 4 | Example 5 | Example 6 | Example 7 |
|---|---|---|---|---|---|---|---|---|---|
| Surface treatment of silica fine particles | IPA dispersion colloidal silica*[1] | | 100 | 100 | 100 | 100 | 100 | 100 | 100 |
| | Silane compound (f) | MPS*[2] | 4.5 | 4.5 | 4.5 | 4.5 | 4.5 | 4.5 | 4.5 |
| | Silane compound (g) | PHS*[3] | 4.5 | 4.5 | 4.5 | 4.5 | 4.5 | 4.5 | 4.5 |
| Silica dispersion resin composition | Silica fine particles (a) dispersion liquid | | 109 | 109 | 109 | 109 | 109 | 109 | 109 |
| | (Meth)acrylate (b) | TMPTA*[4] | 22.5 | 50 | 22.5 | 22.5 | 22.5 | 50 | 22.5 |
| | | DPHA*[5] | | | | | | | |
| | | PETA*[6] | | | | | | | |
| | (Meth)acrylate (c) | ADMA*[7] | 22.5 | 10 | | 22.5 | 22.5 | 10 | |
| | | DCPMA*[8] | | | 22.5 | | | | 22.5 |
| Light-shielding resin composition | Silica dispersion resin composition | | 95 | 95 | 95 | 98 | 95 | 95 | 95 |
| | Black inorganic fine particles (e) | SIO6-5*[9] | 5 | 5 | 5 | 2 | 5 | 5 | 5 |
| Hardening resin composition | Light-shielding resin composition | | 100 | 100 | 100 | 100 | 100 | 100 | 100 |
| | Polymerization initiator (d) | TPO-L*[10] | 4 | 4 | 4 | 4 | | | |
| | | Perbutyl O*[11] | 1 | 1 | 1 | 1 | 1 | 1 | 1 |

| | | | Example 8 | Example 9 | Example 10 | Example 11 | Co-Example 1 | Co-Example 2 | Co-Example 3 |
|---|---|---|---|---|---|---|---|---|---|
| Surface treatment of silica fine particles | IPA dispersion colloidal silica*[1] | | 100 | 120 | 100 | 100 | 120 | 120 | |
| | Silane compound (f) | MPS*[2] | 4.5 | 6.5 | 4.5 | 4.5 | 6.5 | 6.5 | |
| | Silane compound (g) | PHS*[3] | 4.5 | 4.3 | 4.5 | 4.5 | 4.3 | 4.3 | |
| Silica dispersion resin composition | Silica fine particles (a) dispersion liquid | | 109 | 130.8 | 109 | 109 | 130.8 | 130.8 | |
| | (Meth)acrylate (b) | TMPTA*[4] | 22.5 | 27 | | | | 54 | 45 |
| | | DPHA*[5] | | | 22.5 | | | | |
| | | PETA*[6] | | | | 22.5 | | | |
| | (Meth)acrylate (c) | ADMA*[7] | 22.5 | 27 | 22.5 | 22.5 | 54 | | 45 |
| | | DCPMA*[8] | | | | | | | |
| Light-shielding resin composition | Silica dispersion resin composition | | 98 | 90 | 95 | 95 | 90 | 90 | 90 |
| | Black inorganic fine particles (e) | SIO6-5*[9] | 2 | 10 | 5 | 5 | 10 | 10 | 10 |
| Hardening resin composition | Light-shielding resin composition | | 100 | 100 | 100 | 100 | 100 | 100 | 100 |
| | Polymerization initiator (d) | TPO-L*[10] | | | | | | | |
| | | Perbutyl O*[11] | 1 | 1 | 1 | 1 | 1 | 1 | 1 |

(Unit: part by mass)

*[1]Silica content: 30% by mass, Average particle diameter: 10 to 20 nm, Product name: SNOWTEX IPA-ST, manufactured by Nissan Chemical Industries, Ltd.
*[2]γ-methacryloxypropyltrimethoxysilane
*[3]phenyltrimethoxysilane
*[4]trimethylolpropanetriacrylate, Product name: Viscoat #295, manufactured by Osaka Organic Chemical Industries Ltd.
*[5]dipentaerythritolhexaacrylate, Product name: Light Acrylate DPE-6A, manufactured by Kyoeisha Chemical Co., Ltd.
*[6]pentaerythritolhexaacrylate, Product name: Light Acrylate PE-3A, manufactured by Kyoeisha Chemical Co., Ltd.
*[7]adamantylmethacrylate, Product name: ADMA, manufactured by Osaka Organic Chemical Industies Ltd.
*[8]dicyclopentanylmethacrylate, Product name: FA-513M, manufactured by Hitachi Chemical Co., Ltd.
*[9]Carbon blacks surface-treated with silicone, Product name: SI06-5, manufactured by Daito Kasei Kogyo Co., Ltd.
*[10]diphenyl(2,4,6-trimethylbenzoyl)phosphineoxide, Product name: Speedcure TPO-L, manufactured by Nihon Siber Hegner K.K.
*[11]t-butylperoxy(2-ethylhexanoate), Product name: Purbutyl O; manufactured by NOF Corporation

TABLE 2

| | Hardening resin composition | Molding processability | Shieldability | Heat resistantce form stability | 5% weight loss temperature (° C.) |
|---|---|---|---|---|---|
| Example 1 | BR-1 | A | A | A | 354 |
| Example 2 | BR-2 | A | A | A | 392 |
| Example 3 | BR-3 | A | A | A | 318 |
| Example 4 | BR-4 | A | A | A | 350 |
| Example 5 | BR-5 | A | A | A | 347 |
| Example 6 | BR-6 | A | A | A | 390 |
| Example 7 | BR-7 | A | A | A | 322 |

TABLE 2-continued

|  | Hardening resin composition | Molding processability | Shieldability | Heat resistantce form stability | 5% weight loss temperature (° C.) |
|---|---|---|---|---|---|
| Example 8 | BR-8 | A | A | A | 349 |
| Example 9 | BR-9 | A | A | A | 376 |
| Example 10 | BR-10 | A | A | A | 385 |
| Example 11 | BR-11 | A | A | A | 374 |
| Comparative Example 1 | BR-12 | — | — | — | — |
| Comparative Example 2 | BR-13 | C | A | A | 333 |
| Comparative Example 3 | BR-14 | — | — | — | — |

TABLE 3

|  |  |  | Example 12 | Example 13 | Example 14 | Example 15 | Example 16 | Example 17 | Example 18 |
|---|---|---|---|---|---|---|---|---|---|
| Surface treatment of silica fine particles | IPA dispersion colloidal silica*1 |  | 125.3 | 125.3 | 125.3 | 125.3 | 120 | 120 | 120 |
|  | Silane compound (f) | MPS*2 | 6.8 | 6.8 | 6.8 | 6.8 | 6.5 | 6.5 | 6.5 |
|  | Silane compound (g) | PHS*3 | 4.5 | 4.5 | 4.5 | 4.5 | 4.3 | 4.3 | 4.3 |
| Silica dispersion resin composition | Silica fine particles (a) dispersion liquid |  | 136.6 | 136.6 | 136.6 | 136.6 | 130.8 | 130.8 | 130.8 |
|  | (Meth)acrylate (b) | TMPTA*4 | 28.2 | 26.2 | 28.2 | 28.2 | 27 |  |  |
|  |  | DPHA*5 |  |  |  |  |  | 27 |  |
|  |  | PETA*6 |  |  |  |  |  |  | 27 |
|  | (Meth)acrylate (c) | ADMA*7 | 28.2 | 28.2 | 28.2 | 28.2 | 27 | 27 | 27 |
| Light-shielding resin composition | Silica dispersion resin composition |  | 96 | 96 | 96 | 96 | 90 | 90 | 90 |
|  | Black inorganic fine particles (e) | VGCF*12 | 4 |  |  |  |  |  |  |
|  |  | VGCF-H*13 |  | 4 |  |  | 10 | 10 | 10 |
|  |  | VGCF-S*14 |  |  | 4 |  |  |  |  |
|  |  | Meijo Arc*15 |  |  |  | 4 |  |  |  |
| Hardening resin composition | Light-shielding resin composition |  | 100 | 100 | 100 | 100 | 100 | 100 | 100 |
|  | Polymerization initiator (d) | PerbutylO*11 | 1 | 1 | 1 | 1 | 1 | 1 | 1 |

|  |  |  | Co-Example 4 | Co-Example 5 | Co-Example 6 |
|---|---|---|---|---|---|
| Surface treatment of silica fine particles | IPA dispersion colloidal silica*1 |  | 120 | 120 |  |
|  | Silane compound (f) | MPS*2 | 6.5 | 6.5 |  |
|  | Silane compound (g) | PHS*3 | 4.3 | 4.3 |  |
| Silica dispersion resin composition | Silica fine particles (a) dispersion liquid |  | 130.8 | 130.8 |  |
|  | (Meth)acrylate (b) | TMPTA*4 |  | 54 | 45 |
|  |  | DPHA*5 |  |  |  |
|  |  | PETA*6 |  |  |  |
|  | (Meth)acrylate (c) | ADMA*7 | 54 |  | 45 |
| Light-shielding resin composition | Silica dispersion resin composition |  | 90 | 90 | 90 |
|  | Black inorganic fine particles (e) | VGCF*12 |  |  |  |
|  |  | VGCF-H*13 | 10 | 10 | 10 |
|  |  | VGCF-S*14 |  |  |  |
|  |  | Meijo Arc*15 |  |  |  |
| Hardening resin composition | Light-shielding resin composition |  | 100 | 100 | 100 |
|  | Polymerization initiator (d) | PerbutylO*11 | 1 | 1 | 1 |

(Unit: part by mass)
*1Silica content: 30% by mass, Average particle diameter: 10 to 20 nm, Product name: SNOWTEX IPA-ST, manufactured by Nissan Chemical Industries, Ltd.
*2γ-methacryloxypropyltrimethoxysilane
*3phenyltrimethoxysilane
*4trimethylolpropanetriacrylate, Product name: Viscoat #295, manufactured by Osaka Organic Chemical Industries Ltd.
*5dipentaerythritolhexaacrylate, Product name: Light Acrylate DPE-6A, manufactured by Kyoeisha Chemical Co., Ltd,
*6pentaerythritolhexaacrylate, Product name: Light Acrylate PE-3A, manufactured by Kyoeisha Chemical Co., Ltd.
*7adamantylmethacrylate, Product name: ADMA, manufactured by Osaka Organic Chemical Industies Ltd.
*11t-butylperoxy(2-ethylhexanoate), Product name: Purbutyl O, manufactured by NOF Corporation
*12Product name: VGCF(trade name), manufactured by Showa Denko, K.K.
*13Product name: VGCF-H(trade name), manufactured by Showa Denko, K.K.
*14Product name: VGCF-S(trade name), manufactured by Showa Denko, K.K.
*15Product name: Meijo Arc APJ, manufactured by Meijo Nano Carbon Co., Ltd.

TABLE 4

|  | Hardening resin composition | Molding processability | Shieldability | Heat resistance form stability | 5% Weight loss temperature (° C.) | Volume resistivity (Ω · cm) |
|---|---|---|---|---|---|---|
| Examples 1 to 11 | | | (See Table 2) | | | 100,000 or more |
| Example 12 | BR-15 | A | A | A | 347 | 5.9 |
| Example 13 | BR-16 | A | A | A | 343 | 0.6 |
| Example 14 | BR-17 | A | A | A | 346 | 450 |
| Example 15 | BR-18 | A | A | A | 344 | 23.6 |
| Example 16 | BR-19 | A | A | A | 350 | 0.56 |
| Example 17 | BR-20 | A | A | A | 363 | 0.63 |
| Example 18 | BR-21 | A | A | A | 350 | 0.45 |
| Comparative Example 4 | BR-22 | — | — | — | — | — |
| Comparative Example 5 | BR-23 | C | A | A | 334 | 28 |
| Comparative Example 6 | BR-24 | — | — | — | — | — |

INDUSTRIAL APPLICABILITY

The hardening composition of the present invention comprising the silica fine particles surface-treated with the specific two kinds of silane compounds, the specific two kinds of (meth)acrylates, the polymerization initiator and the black inorganic fine particles has low viscosity and superior handling characteristics.

Further, the hardening composition, by being hardened, can give a hardened product which has superior light-shielding effect, heat resistance and molding processability and which can be suitably used for a light-shielding component and the like for various optical equipments such as a camera, a video camera, a copying machine and a developing machine. In particular, the composition containing carbon nanotubes as the black inorganic fine particles provides a product further having superior conductivity.

The invention claimed is:

1. A hardening composition comprising:
   silica fine particles (a),
   a (meth)acrylate (b) having two or more ethylenically unsaturated groups and being free from cyclic structure,
   a (meth)acrylate (c) having an ethylenically unsaturated group and having an alicyclic structure,
   a polymerization initiator (d) and
   black inorganic fine particles (e), wherein the silica fine particles (a) are surface-treated with a silane compound (f) represented by the following general formula (1) and a silane compound (g) represented by the following general formula (2):

[Chem. 1]

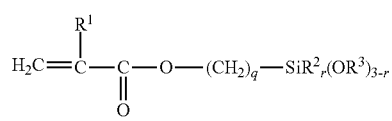

(1)

(in the formula (1), $R^1$ represents a hydrogen atom or a methyl group, $R^2$ represents an alkyl group having 1 to 3 carbon atoms or a phenyl group, $R^3$ represents a hydrogen atom or a hydrocarbon group having 1 to 10 carbon atoms; q represents an integer of 1 to 6; and r represents an integer of 0 to 2,

[Chem. 2]

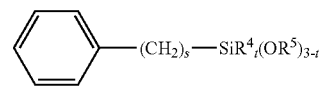

(2)

(in the formula (2), $R^4$ is an alkyl group having 1 to 3 carbon atoms or a phenyl group which may have a substituent; $R^5$ is a hydrogen atom or a hydrocarbon group having 1 to 10 carbon atoms; s is an integer of 0 to 6; and t is an integer of 0 to 2.

2. The hardening composition as claimed in claim 1, wherein the (meth)acrylate (b) is a (meth)acrylate having three ethylenically unsaturated groups and being free from cyclic structure.

3. The hardening composition as claimed in claim 1, wherein the silica fine particles (a) are obtained by surface-treating silica fine particles which have not been surface-treated with 5 to 25 parts by mass of the silane compound (f) based on 100 parts by mass of the silica fine particles and with 5 to 25 parts by mass of the silane compound (g) based on 100 parts by mass of the silica fine particles.

4. The hardening composition as claimed in claim 1, wherein the glass transition temperature of a homopolymer of the (meth)acrylate (b) and the glass transition temperature of a homopolymer of the (meth)acrylate (c) are 150° C. or higher.

5. The hardening composition as claimed in claim 1, wherein the black inorganic fine particles (e) are at least one selected from the group consisting of carbon blacks, titanium black and carbon nanotubes.

6. The hardening composition as claimed in claim 1, wherein the black inorganic fine particles (e) are carbon blacks and/or titanium black.

7. The hardening composition as claimed in claim 6, wherein the carbon blacks and/or titanium black have a number average particle diameter of 5 to 200 nm.

8. The hardening composition as claimed in claim 1, wherein the black inorganic fine particles (e) are carbon blacks surface-treated with a silicone resin.

9. The hardening composition as claimed in claim 8, wherein the carbon blacks surface-treated with a silicone resin have a number average particle diameter of 5 to 200 nm.

10. The hardening composition as claimed in claim 1, wherein the black inorganic fine particles (e) are carbon nanotubes.

11. The hardening composition as claimed in claim 10, wherein the carbon nanotubes have an average diameter of 0.5 to 200 nm and an average length of 100 nm to 50 μM.

12. The hardening composition as claimed in claim 1, which has a viscosity of 30 to 2000 mPa·s.

13. A hardened product formed by hardening the hardening composition as described in claim 1.

14. A light-shielding film comprising the hardened product as described in claim 13.

15. The hardening composition as claimed in claim 2, wherein the silica fine particles (a) are obtained by surface-treating silica fine particles which have not been surface-treated with 5 to 25 parts by mass of the silane compound (f) based on 100 parts by mass of the silica fine particles and with 5 to 25 parts by mass of the silane compound (g) based on 100 parts by mass of the silica fine particles.

* * * * *